United States Patent
Ohara (10) Patent No.: US 10,595,003 B2
(45) Date of Patent: Mar. 17, 2020

(54) STEREO CAMERA APPARATUS AND VEHICLE COMPRISING THE SAME

(71) Applicant: KYOCERA Corporation, Kyoto (JP)

(72) Inventor: Naoto Ohara, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 92 days.

(21) Appl. No.: 15/520,760

(22) PCT Filed: Oct. 23, 2015

(86) PCT No.: PCT/JP2015/005346
§ 371 (c)(1),
(2) Date: Apr. 20, 2017

(87) PCT Pub. No.: WO2016/063545
PCT Pub. Date: Apr. 28, 2016

(65) Prior Publication Data
US 2017/0318279 A1    Nov. 2, 2017

(30) Foreign Application Priority Data

Oct. 24, 2014  (JP) ................................. 2014-217370

(51) Int. Cl.
*H04N 13/239*     (2018.01)
*G01C 3/06*       (2006.01)
*G06T 7/593*      (2017.01)
*G06T 7/70*       (2017.01)
*H04N 13/106*     (2018.01)
(Continued)

(52) U.S. Cl.
CPC ............. *H04N 13/239* (2018.05); *G01C 3/06* (2013.01); *G06K 9/00805* (2013.01);
(Continued)

(58) Field of Classification Search
CPC .. H04N 13/239; H04N 13/106; H04N 13/139; H04N 2013/0081; G06T 7/593;
(Continued)

(56) References Cited

U.S. PATENT DOCUMENTS

| 9,443,313 B2 | 9/2016 | Muramatsu et al. |
| 2004/0022418 A1* | 2/2004 | Oota ........................ G06K 9/32 382/106 |

(Continued)

FOREIGN PATENT DOCUMENTS

| EP | 2546602 A1 | 1/2013 |
| JP | H07-225126 A | 8/1995 |

(Continued)

OTHER PUBLICATIONS

Cosmin D. Pantilie et al.; SORT-SGM: Subpixel Optimized Real-Time Semiglobal Matching for Intelligent Vehicles; IEEE Transactions on Vehicular Technology; Mar. 2012; pp. 1032-1042; vol. 61, No. 3.

(Continued)

*Primary Examiner* — Maria E Vazquez Colon
(74) *Attorney, Agent, or Firm* — Studebaker & Brackett PC (57) ABSTRACT

The stereo camera apparatus includes a stereo camera and a first controller configured to detect a target object to be detected based on at least one first region among a plurality of regions located at different positions in a predetermined direction in an image captured by the stereo camera, generate interpolation pixels by performing pixel interpolation based on at least original pixels that constitute an image of the detected object and detect distance from a reference position to a position of the detected object based on at least the interpolation pixels. As a result, a stereo camera apparatus capable of detecting an object located far away from a vehicle with a high accuracy while suppressing the processing load and a vehicle can be provided.

10 Claims, 7 Drawing Sheets

(51) Int. Cl.
*G06K 9/00* (2006.01)
*G06K 9/46* (2006.01)
*H04N 13/00* (2018.01)
*H04N 13/139* (2018.01)

(52) U.S. Cl.
CPC ............ *G06K 9/4604* (2013.01); *G06T 7/593* (2017.01); *G06T 7/70* (2017.01); *H04N 13/106* (2018.05); *G06T 2207/30261* (2013.01); *H04N 13/139* (2018.05); *H04N 2013/0081* (2013.01)

(58) Field of Classification Search
CPC ... G06T 7/70; G06T 2207/30261; G01C 3/06; G06K 9/00805; G06K 9/4604
See application file for complete search history.

(56) References Cited

U.S. PATENT DOCUMENTS

| | | | | |
|---|---|---|---|---|
| 2012/0327189 | A1* | 12/2012 | Muramatsu | G01C 3/06 348/46 |
| 2014/0132707 | A1* | 5/2014 | Hashimoto | G01C 3/06 348/36 |
| 2015/0339825 | A1 | 11/2015 | Muramatsu et al. | |
| 2015/0371095 | A1* | 12/2015 | Hartmann | G06K 9/00791 348/148 |
| 2016/0014406 | A1* | 1/2016 | Takahashi | G06T 7/73 348/148 |

FOREIGN PATENT DOCUMENTS

| | | |
|---|---|---|
| JP | H08-255250 A | 10/1996 |
| JP | 2005-250994 A | 9/2005 |
| JP | 2008-276308 A | 11/2008 |
| JP | 2010-079582 A | 4/2010 |
| JP | 2011-191905 A | 9/2011 |

OTHER PUBLICATIONS

International Search Report issued in PCT/JP2015/005346; dated Jan. 19, 2016.

Written Opinion issued in PCT/JP2015/005346; dated Jan. 19, 2016; with English language Concise Explanation.

* cited by examiner

STEREO CAMERA APPARATUS AND VEHICLE COMPRISING THE SAME

CROSS REFERENCE TO RELATED APPLICATION

This application claims priority to and the benefit of Japanese Patent Application No. 2014-217370 filed on Oct. 24, 2014, the entire contents of which are incorporated herein by reference.

TECHNICAL FIELD

This disclosure relates to a stereo camera apparatus and a vehicle comprising the same.

BACKGROUND

An on-road object recognition apparatus for a vehicle is known in which a wide range of image of a road and an object on a road is divided into windows and an object is recognized for each window.

SUMMARY

Technical Problem

However, an object located far away from a stereo camera appears smaller in an image than an object located close to the stereo camera. Therefore the accuracy of distance detection using pixels is low. Further, in a stereo camera mounted on a vehicle moving at a high speed, the processing load is needed to be suppressed so as to detect distance at a high speed. Therefore, distance detection with a high accuracy while suppressing the processing load is required also for an object located far away.

It would therefore be helpful to provide a stereo camera apparatus capable of detecting distance from an object located far away from a vehicle to the vehicle with a high accuracy while suppressing the processing load and a vehicle.

Solution to Problem

A stereo camera apparatus according to an embodiment includes:
 a stereo camera; and
 a first controller configured to detect a target object to be detected based on at least one first region among a plurality of regions located at different positions in a predetermined direction in an image captured by the stereo camera, generate interpolation pixels by performing pixel interpolation based on at least original pixels that configure an image of the detected object and detect distance from a reference position to a position of the detected object based on at least the interpolation pixels.

A vehicle according to one embodiment includes:
 a stereo camera; and
 a first controller configured to detect a target object to be detected based on at least one first region among a plurality of regions located at different positions in a predetermined direction in an image captured by the stereo camera, generate interpolation pixels by performing pixel interpolation based on at least original pixels that constitute an image of the detected object and detect distance from a reference position to a position of the detected object based on at least the interpolation pixels.

BRIEF DESCRIPTION OF THE DRAWINGS

In the accompanying drawings.

DETAILED DESCRIPTION

One embodiment will be described below with reference to FIGS. 1 to 10.

<Function Configuration According to One Embodiment>

Figure 1:
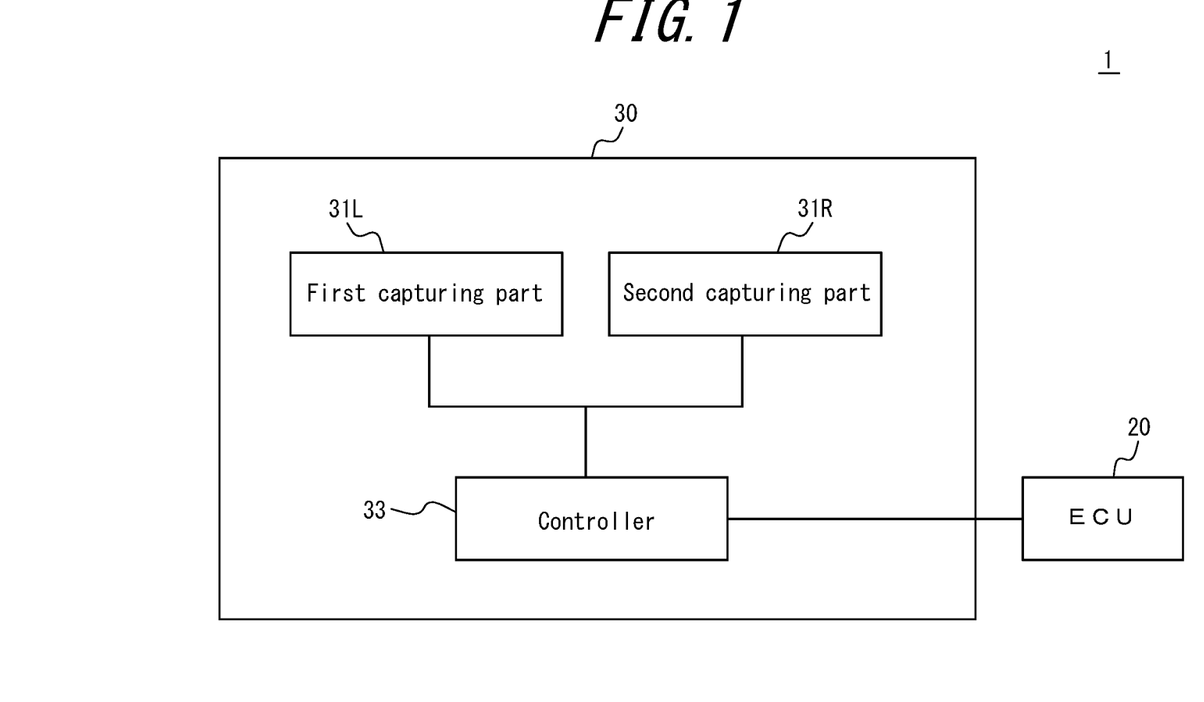
FIG. 1 is a function block diagram illustrating a function configuration of a stereo camera system comprising a stereo camera apparatus according to one embodiment.

Function configuration of a stereo camera system 1 according to one embodiment will be described with reference to FIGS. 1 to 7. As illustrated in FIG. 1, the stereo camera system 1 includes an ECU (Electronic Control Unit) 20 and a stereo camera apparatus 30. The ECU 20 and the stereo camera apparatus 30 are connected to each other via a wired or wireless communication network and transmit/receive a variety of information. The stereo camera apparatus 30 according to this embodiment is assumed to be mounted on a moving body 10 such as an automobile, for example. It is noted, however, that the stereo camera apparatus 30 can be mounted on a moving body 10 other than an automobile as well.

The ECU 20 controls a device such as an engine, a brake, a steering (steering gear), a direction indicator or the like that is operated to run the moving body 10. The ECU 20 obtains the driving information indicating the driving conditions such as a speed, an acceleration rate, brake operation, a steering rudder angle, a direction indicated by a direction indicator, a headlight illumination range or the like from the above mentioned device. Further, the ECU 20 outputs the driving information to the stereo camera apparatus 30. Hereinafter, among the driving information, the steering rudder angle and the direction indicated by a direction indicator are referred to as the direction information.

The stereo camera apparatus 30 includes a stereo camera comprising at least two capturing parts such as a first capturing part 31L and a second capturing part 31R and a controller 33 (a first controller).

The first and second capturing parts 31L and 31R comprise, for example, the same optical system and the same image sensor such as CMOS, CCD or the like, and an image formed by the optical system is captured by an image sensor.

The angle of view of optical system may be wide. The first and second capturing parts 31L and 31R capture one frame image every predetermined time, such as every 0.1 second, for example.

Next, an aspect of mounting the first and second capturing parts 31L and 31R on the moving body 10 will be described with reference to FIGS. 2 and 3.

Figure 2:
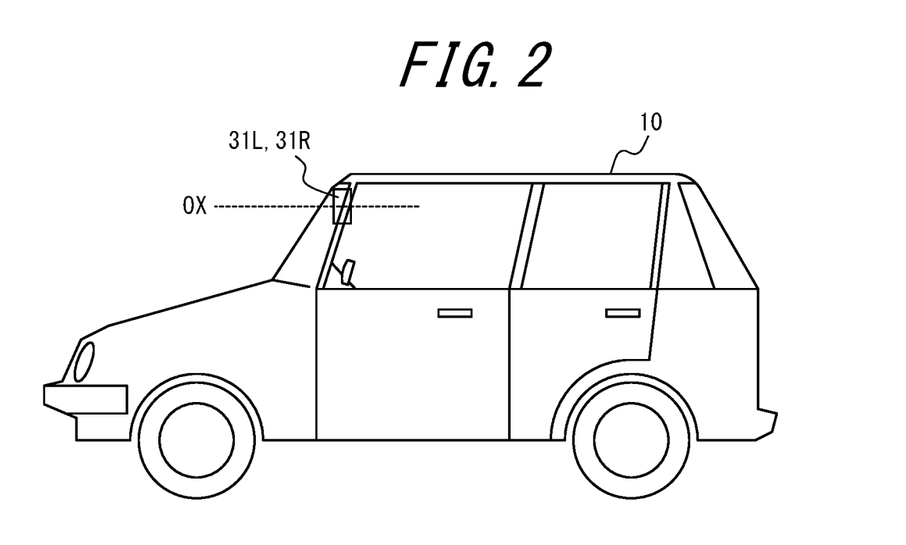
FIG. 2 is a side view of a moving body equipped with a stereo camera comprising capturing parts of the stereo camera system illustrated in FIG. 1.
Figure 3:
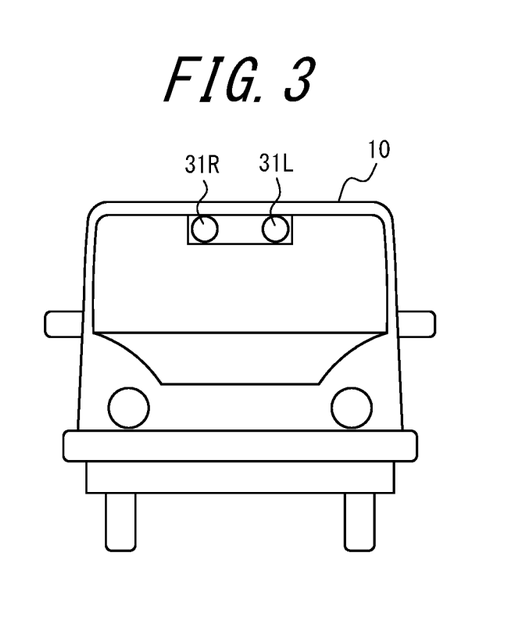
FIG. 3 is an elevation view of the moving body equipped with a stereo camera comprising capturing parts of the stereo camera system illustrated in FIG. 1.

As illustrated in FIG. 2, the first and second capturing parts 31L and 31R are mounted so that the optical axis OX of the optical system in the first and second capturing parts 31L and 31R will be in parallel with the forward direction so as to capture a front view of the moving body 10, for example. Further, as illustrated in FIG. 3, image sensors installed respectively in the first capturing part 31L and the second capturing part 31R are disposed so that they are located in the same plane vertical to the optical axis of the capturing parts and a line passing through reference points such as each center of the image sensors will be horizontal.

The controller 33 is realized by an image processing microprocessor (Micro Processing Unit: MPU). The controller 33 obtains an image as the image information from the first and second capturing parts 31L and 31R via an image input/output interface (Interface I/F). The controller 33 also obtains the driving information of the moving body 10 from the ECU 20 via the CAN input/output interface. The controller 33 detects distance from the reference point of the stereo camera apparatus 30 to the object captured in an image based on the image captured by the first and second capturing parts 31L and 31R and the driving information. The reference point is any point that can be a reference for detecting distance for a stereo camera, and can be a middle point between each image sensor of the first and second capturing parts 31L and 31R, for example.

In this embodiment, the controller 33 detects distance by using a distance detection method for an object located near the moving body 10 (a near object) and a distance detection method for an object located far away from the moving body 10 (a distant object) depending on a plurality of regions in the image. The region is a region that constitutes a part of whole region of an image. The controller 33 positions a plurality of regions at different positions in a predetermined direction in an image. The predetermined direction is a direction substantially corresponding to a vertically upward direction in a captured image when the stereo camera apparatus 30 is mounted on the moving body 10. Further, among the plurality of regions, toward a predetermined direction, a region becomes smaller and an object located further away is captured. In the following description, a plurality of regions are specified as a first region F and a second region N, and the first region F is located further toward the predetermined direction than the second region N.

The position of each first and second region F and N in the direction corresponding to the vertical direction may be determined previously, or may be determined based on the traveling speed of the moving body 10. As a method of determining the position based on a traveling speed of the moving body 10, respective positions of the first and second regions F and N are determined so that they are located further toward a predetermined direction as the moving body 10 travels faster, for example.

Figure 4:
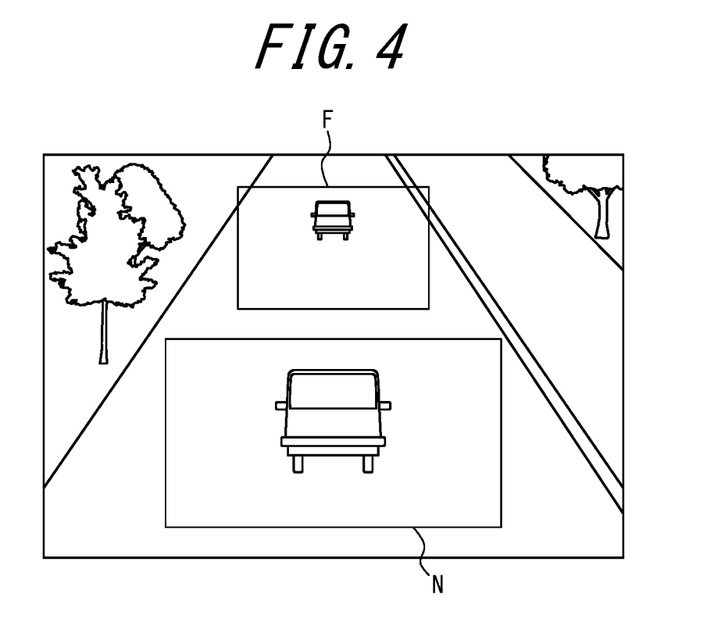
FIG. 4 is a first view illustrating an example of an image captured by a first capturing part illustrated in FIG. 1.
Figure 5:
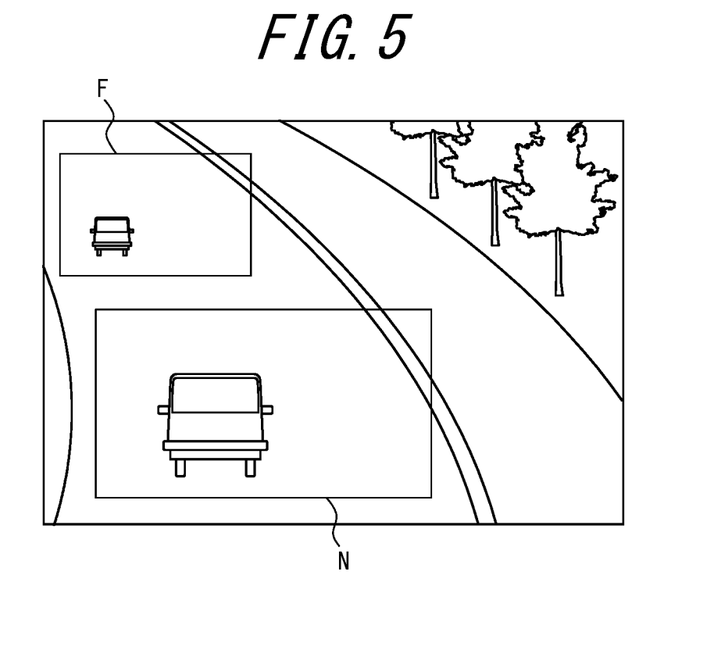
FIG. 5 is a second view illustrating an example of an image captured by the first capturing part illustrated in FIG. 1.

Further, the controller 33 determines respective positions of the first and second regions F and N with respect to the direction corresponding to the horizontal direction in the image based on the traveling direction of the moving body 10. Here, a method of determining respective positions of the first and second regions F and N in the direction corresponding to the horizontal direction will be described in detail with reference to FIGS. 4 and 5. FIG. 4 is a view illustrating an example of an image captured by the first capturing part 31L when the moving body 10 travels straight ahead. FIG. 5 is a view illustrating an example of an image captured by the first capturing part 31L when the moving body 10 travels to the left.

Further, as illustrated in FIG. 4, the controller 33 determines respective positions of the first and second regions F and N so that they are located in the central part in the horizontal direction in the image when the moving body 10 travels straight ahead. As illustrated in FIG. 5, when the moving body 10 travels to the left, the respective positions of the first and second regions F and N are determined so that they are located on the left side of the central part in the horizontal direction in the image. Further, the first and second regions F and N may be determined based on the size of the rudder angle of the moving body 10. For example, when the moving body 10 travels 20 degrees to the left relative to the straight traveling direction, the first and second regions F and N are determined so that they are located more leftward, respectively, compared to the case where the moving body 10 travels 10 degrees to the left relative to the straight traveling direction. Further, the image may include a plurality of the first and second regions F and N respectively.

Subsequently, with respect to a distance detection method for respective regions, a distance detection method for short distance and that for long distance will be described separately.

First, a distance detection method for short distance will be described. In distance detection for short distance, the controller 33 clops the second region N, which is a region for detecting a near object, from the first image and the second image captured respectively by the first and second capturing parts 31L and 31R. After clopping, the controller 33 performs stereo matching using the clopped images and detects distance.

Next, a function of the controller 33 to perform stereo matching to detect distance will be described in detail. Based on original pixels of an image of an object captured in the first and second images, the controller 33 detects distance from a reference position to the object. In order to detect distance to the position of the detected object, stereo matching such as Semi Global Matching (SGM), etc. that uses SAD (Sum of Absolute Difference) function may be used.

Next, a distance detection method for long distance will be described. In distance detection for long distance, the controller 33 clops the first region F, which is a region for detecting a distant object, from the first image. After clopping, the controller 33 performs object detection. Next, the controller 33 uses at least original pixels that constitute an image of the detected object and performs pixel interpolation with respect to original pixels in a region that is a little larger than a drawing region of the image of the object, for example After performing pixel interpolation, the controller 33 performs pixel interpolation based on, in the second image captured at the same time, original pixels in the region corresponding to a drawing region of the object detected in the first region of the first image. Then the controller 33 detects distance based on at least interpolation pixels generated by pixel interpolation of the first and second images.

Here, object detection performed by the controller 33 will be described in detail. The controller 33 detects a predetermined target object to be detected such as a person, a vehicle or the like by using HOG (Histogram of Oriented Gradients) feature amount only with respect to the first region F in the image captured by the first capturing part 31L. More specifically, the controller 33 calculates the luminance gradient of pixels that constitute the first region F, and detects an object based on the calculated luminance gradient and the learning data of SVM (Support Vector Machine).

Next, the pixel interpolation performed by the controller 33 will be described in detail. The controller 33 generates interpolation pixels based on original pixels in a region that is a little larger than a drawing region of an image of a detected object in an image of the same frame of the first image captured every predetermined time interval. The controller 33 weights each luminance value of two or more adjacent original pixels and computes using the linear interpolation method, for example, thereby calculating the luminance value at the central position among respective centers of the original pixels to generate interpolation pixels each having the calculated luminance value. Further, the controller 33 may perform pixel interpolation by using not only the linear interpolation method, but also the Nearest Neighbor Method, the Bicubic method, the Lanczos algorithm or the like.

Next, a region of the second image corresponding to a drawing region of an object detected in the first region of the first image will be described in detail with reference to FIGS. 6 and 7.

Figure 6:
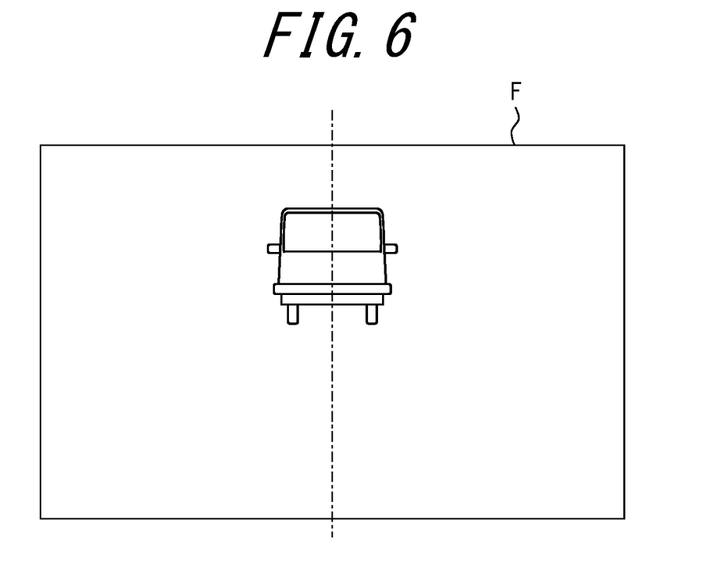
FIG. 6 is an enlarged view of a first region in a first image.
Figure 7:
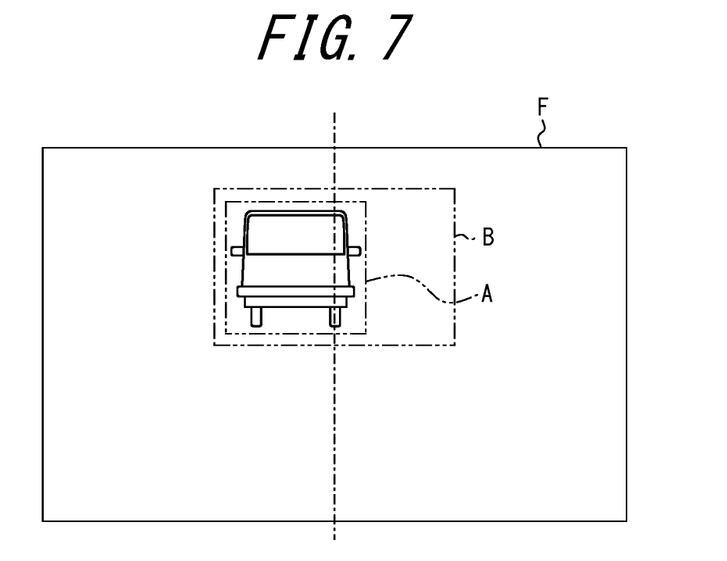
FIG. 7 is an enlarged view of a first region in a second image.

As illustrated in FIG. 6, as an example of a detected object, an automobile is captured nearly in the center of the first region of the first image. According to the above mentioned mounting condition of the first capturing part and the second capturing part, the automobile is supposed to be captured on the left side of the center in the first region of the second image. Thus, as illustrated in FIG. 7, the region A located on the left side of the region located at the same position as the drawing region of the first image is determined as a corresponding region. Further, a wide region B that includes the region located at the same position as the region where an image of the object is detected in the first image may be determined as a corresponding region.

Next, by stereo matching, the controller 33 detects distance from the reference position to the object based on at least interpolation pixels of the image of the object captured in the first and second images. That is, the controller 33 may detect distance based on both original pixels that constitute the image of the detected object and interpolation pixels, or based on only interpolation pixels. Except that stereo matching is performed with respect to the second region based on original pixels and stereo matching is performed with respect to the first region based on at least interpolation pixels, stereo matching and distance detection performed by the controller 33 with respect to the first region are the same as those performed with respect to the second region mentioned above.

Further, the distance from the reference point to the object detected in the above mentioned manner with respect to the first region and the second region is transmitted to the ECU 20 and is used to support operation of the moving body 10.

The function of each component of the stereo camera apparatus 30 can be realized by storing the program that describes the processing for realizing such function in the storage of the computer and by reading such program by the CPU of the computer to execute it.

<Operation According to One Embodiment>

Operation of the stereo camera system 1 according to this embodiment will be described.

The first and second capturing parts 31L and 31R respectively capture an image of front of the moving body 10. When an image is captured, the controller 33 obtains the image information representing the captured image from the first and second capturing parts 31L and 31R. Meanwhile the ECU 20 obtains the driving information, and the controller 33 obtains the driving information from the ECU 20.

Subsequently, the controller 33 processes the image based on the driving information.

Here, the processing of the image performed by the controller 33 will be described in detail. First, the processing performed by the controller 33 with respect to the second region N to detect distance to a near object will be described using FIG. 8.

Figure 8:
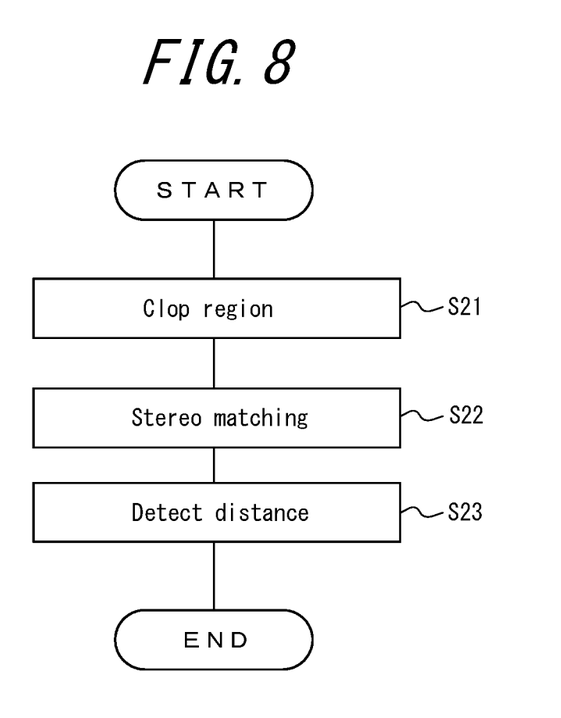
FIG. 8 is a flow chart illustrating an operation relating to a second region by a controller illustrated in FIG. 1.

As illustrated in FIG. 8, first, the controller 33 clops the second region N from images respectively captured by the first and second capturing parts 31L and 31R based on the driving condition represented by the driving information (step S21). Next, the controller 33 performs stereo matching based on original pixels that constitute the clopped second region N (step S22), and detects distance from the reference point to the object captured in the second region N (step S23).

Next, the processing performed by the controller 33 with respect to the first region F will be described using FIG. 9.

Figure 9:
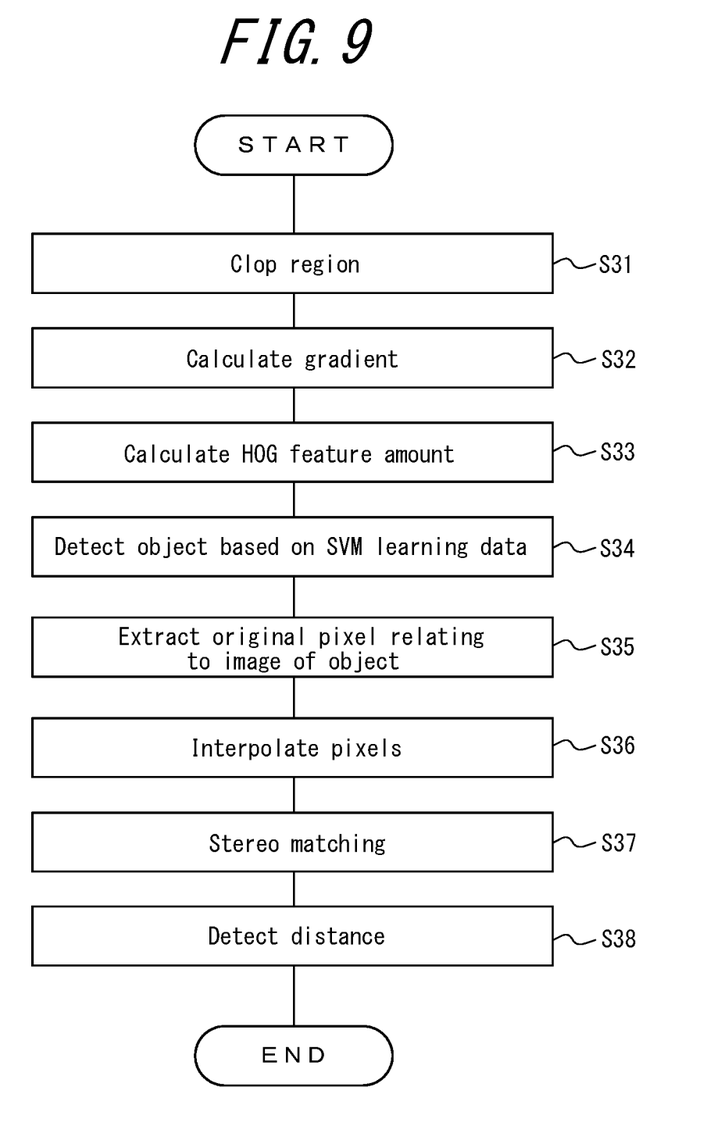
FIG. 9 is a flow chart illustrating an operation relating to the first region by the controller illustrated in FIG. 1.

As illustrated in FIG. 9, first, the controller 33 clops the first region F from the first image based on the driving condition represented by the driving information (step S31). After the first region F is clopped in step S31, the controller 33 calculates the luminance gradient of pixels that constitute the first region F (step S32). Then, the controller 33 calculates HOG feature amount based on the gradient calculated in step S32 (step S33), and detects a target object to be detected based on the calculated HOG feature amount and the learning data of SVM (step S34).

Next, the controller 33 extracts original pixels in a region that is a little larger than a drawing region of the object in the first region of the first image detected in step S34. The controller 33 also extracts original pixels in the region of the second image corresponding to the drawing region of the first image where the image of the object is detected (step S35). Then the controller 33 performs pixel interpolation based on the original pixels extracted from the first and second images in step S35 to generate interpolation pixels (step S36).

After interpolation pixels relating to the image of the detected object are generated with respect to the first and second images in step S36, the controller 33 performs stereo matching based on at least these interpolation pixels (step S37) and detects distance from the detected object to the reference position (step S38).

According to this embodiment, with respect to an object located far away from the stereo camera apparatus 30 and thus appearing small in an image, its distance is detected based on at least interpolation pixels, and as a result, distance can be detected based on a larger number of pixels compared to those in the case where pixel interpolation is not performed. Therefore distance can be detected with a high accuracy. Further, since pixel interpolation is performed only with respect to an image relating to the detected object while such distance detection with a high accuracy is realized, processing amount relating to pixel interpolation can be reduced compared to the case where pixel interpolation is performed with respect to all regions in the image.

Further, according to this embodiment, among a plurality of regions in an image captured by the stereo camera apparatus 30, a region becomes smaller toward a predetermined direction, which allows for reduction in the processing amount relating to object detection and shortening of time required for processing. Further, among the plurality of regions, a region located further toward the predetermined direction is used to detect distance to an object located further away from the stereo camera apparatus 30, and an object located far away appears small in an image. Therefore, even if object detection is performed with respect to a small region, a target object to be detected can be detected.

Further, according to this embodiment, processing speed is increased compared to the case where pixel interpolation is performed by using an image containing different frames captured by the first capturing part 31L, such as, for example, an image of one frame and an image of the next frame. This is because, when pixel interpolation is performed by using an image containing different frames, an image of one frame is subjected to pixel interpolation together with an image of the next frame, and therefore the controller 33 should wait to start the processing until an image of the next frame is captured. Therefore, pixel interpolation which can be performed in real time based on pixels that constitute an image of the same frame is suitable for object detection by the stereo camera apparatus 30 mounted on the moving body 10 traveling at a high speed.

Further, according to this embodiment, since a region is determined based on the traveling direction of the moving body 10 and pixel interpolation and distance detection are performed with respect to the region, distance detection can be performed with respect to a region that can be traveled by the moving body 10.

Although the above mentioned embodiment is described as a representative example, it is obvious for a person skilled in the art that many changes and replacements can be made within the spirit and scope of this disclosure. Therefore, it should be noted that this disclosure is not limited by the above mentioned embodiment and may be modified or changed without departing from the scope of claims. For example, a plurality of configuration blocks described in the embodiment may be combined into one or one configuration block may be divided.

Figure 10:
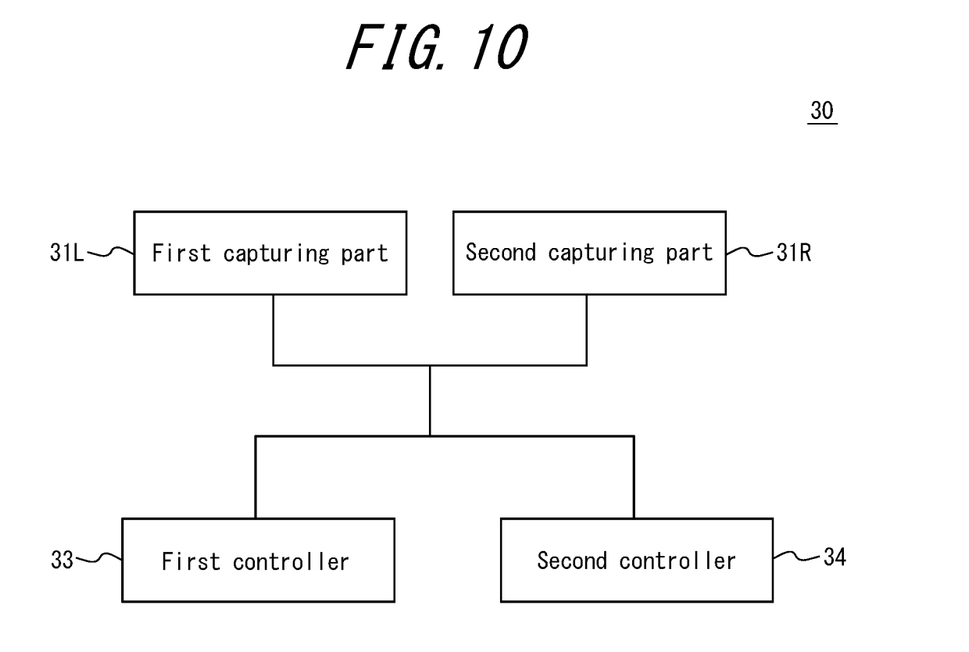
FIG. 10 is a function block diagram illustrating a variation of the function configuration of the stereo camera apparatus illustrated in FIG. 1.

As illustrated in FIG. 10, the stereo camera apparatus 30 may include a stereo camera comprising the first and second capturing parts 31L and 31R, a first controller 33 and a second controller 34. In this manner, when the stereo camera system 1 is configured as a multi-core system including two controllers, the first controller 33 detects distance using the distance detection method for long distance and the second controller 34 detects distance using the distance detection method for short distance. As mentioned above, a plurality of controllers perform processing to different regions, respectively, which allows for reduction in the processing amount of each controller, and as a result, the stereo camera apparatus 30 can perform overall processing at a high speed.

Further, in this embodiment, although the first and second capturing parts 31L and 31R are mounted on a position where a front view of the moving body 10 is captured, they can be mounted on a position where a side or back view of the moving body 10 is captured. When the first and second capturing parts 31L and 31R are mounted on a position where a side or back view of the moving body 10 is captured, the stereo camera apparatus 30 can detect an object located far away on the side or back of the moving body 10 with a high accuracy and at a high processing speed.

Further, in FIGS. 4 and 5 for describing this embodiment, although the first and second regions F and N are illustrated as rectangular in shape, the shape of these regions is not limited to rectangular.

Further, in this embodiment, the size and the shape of a region in an image may be determined based on the driving condition. For example, the size of the region may be determined based on the speed of the moving body 10 and the shape of the region may be determined based on the illumination range or the rudder angle of the headlight.

Further, in this embodiment, the controller 33 may transmit the information on the detected object and the measured size to other apparatuses or systems over the communication network.

REFERENCE SIGNS LIST

1 Stereo camera system
10 Moving body
20 ECU
30 Stereo camera apparatus
31L First capturing part
31R Second capturing part
33 Controller (First controller)
34 Second controller
OX Optical axis
F First region
N Second region

The invention claimed is:

1. A stereo camera apparatus, comprising:
a stereo camera; and
a first controller configured to detect a target object to be detected based on at least one first region among a plurality of regions located at different positions in a predetermined direction in an image captured by the stereo camera, generate interpolation pixels by performing pixel interpolation based on at least original pixels in a region within the first region and detect distance from a reference position to a position of the detected target object based on at least the interpolation pixels, wherein the region within the first region is smaller than the first region and includes an image of the detected target object,
wherein the first controller is configured to determine at least one of position or shape of the first region based on an illumination range of a headlight of a vehicle comprising the stereo camera.

2. The stereo camera apparatus according to claim 1, wherein, among the plurality of regions, a region becomes smaller as it is located toward one side in the predetermined direction.

3. The stereo camera apparatus according to claim 2, wherein, among the plurality of regions, a region located further toward one side is used to detect distance to an object located further away from the stereo camera apparatus.

4. The stereo camera apparatus according to claim 1, wherein the predetermined direction substantially corresponds to a direction corresponding to vertically upward in an image captured by the stereo camera.

5. The stereo camera apparatus according to claim 1, wherein the pixel interpolation is a pixel interpolation that uses the original pixels that constitute an image of a same frame captured by the stereo camera.

6. The stereo camera apparatus according to claim 1, wherein, in a second region different from the first region of the plurality of regions, distance from the reference position to an object drawn in the second region is detected based on original pixels that constitute the second region.

7. The stereo camera apparatus according to claim 6, wherein the first controller detects distance from the reference position to the object drawn in the second region.

8. The stereo camera apparatus according to claim 6, further comprising a second controller configured to detect distance from the reference position to the object drawn in the second region.

9. The stereo camera apparatus according to claim 1, wherein the stereo camera includes two capturing parts, and the first controller is configured to detect the target object based on only an image captured by one of the two capturing parts.

10. A vehicle comprising the stereo camera apparatus according to claim 1.

* * * * *